Patented Mar. 14, 1939

2,150,463

UNITED STATES PATENT OFFICE 2,150,463

MERCAPTOTHIAZOLE DERIVATIVES

Lorin B. Sebrell, Silver Lake, Ohio, assignor to Wingfoot Corporation, Wilmington, Del., a corporation of Delaware No Drawing. Original application July 6, 1936, Serial No. 89,124. Divided and this application July 6, 1936, Serial No. 89,125

13 Claims. (Cl. 260—47)

This invention relates to the vulcanization of rubber and, more particularly, to improvements in the process of accelerating the vulcanization of rubber. It includes the products of the process.

Heretofore it has been known that mercaptobenzothiazole, dibenzothiazyl disulphide and certain derivatives of mercaptobenzothiazole are accelerators of rubber vulcanization. Among the known mercaptobenzothiazole derivatives are di nitro phenyl benzothiazyl sulphide and the amine salts of mercaptobenzothiazole. Mercaptobenzothiazole itself is used extensively, but for some purposes it is desirable that an accelerator with a higher critical temperature be employed. By critical temperature is meant the temperature at which the accelerator initiates vulcanization. Such accelerators having a high critical temperature should also be capable of accelerating the rate of vulcanization quite rapidly at higher temperatures. Accelerators having this effect are known as delayed action accelerators. Dibenzothiazyl disulphide is one of these. Certain mercaptobenzothiazole derivatives have a high critical temperature but are too weak in accelerating power by themselves to be used successfully. They may, however, be employed in conjunction with a basic nitrogen accelerator which acts as a "kicker" or "activator" for the mercaptobenzothiazole derivative. Such accelerator compositions, while not possessing as high a critical temperature as mercaptobenzothiazole and dibenzothiazyl disulphide, often possess the desired delayed action effect.

It is an object of this invention to provide a new class of mercaptobenzothiazole derivatives which are excellent delayed action accelerators when employed with basic nitrogen-containing accelerators of another class. Other objects are to provide improved processes of rubber vulcanization and improved rubber products. Other objects will become apparent as the description of the invention proceeds.

Briefly the invention resides in the discovery that reaction products of mercapto aryl thiazoles, formaldehyde and phenols are excellent delayed action accelerators and when employed with basic nitrogen-containing accelerators cause the vulcanization of rubber in a short time and with excellent results.

The accelerators of the invention are in general, and preferably, resinous materials. Their composition is unknown and they have relatively low melting points. Some of them appear to be semi-crystalline in nature and all are easily prepared in powdered form and may be easily and uniformly incorporated in a rubber mix.

Their method of preparation is rather simple, requiring no expensive apparatus or extended procedure. The preferred method of their preparation is to cause the three materials to react, or the phenol with the preformed reaction product of formaldehyde and mercapto aryl thiazole, in the presence of a resinifying catalyst until a resinous product forms. Generally, it is desirable to heat the reaction mixture for a short period of time. The temperatures required will vary somewhat according to the catalyst employed as will also the times required for the completion of the process. In some cases, it will be found that heating is not necessary. However, in the preferred form of the invention the reactants are heated in the presence of a resinifying catalyst to a temperature of from 100 to 175° C.

The reaction may be carried out at atmospheric pressure. The times required vary from 10 or 15 minutes to several hours. The proportions of the three reacting materials are preferably molar but suitable products may also be made by varying the mercapto aryl thiazole from ½ to 1½ mols, the formaldehyde from ½ to 1½ mols and the phenol from ½ to 1½ mols.

Practically any resinifying catalyst which may be used in the preparation of the known phenolic resins may be employed in the preparation of the accelerators of this invention. Among them are alkaline materials such as sodium hydroxide, calcium hydroxide, lime, etc.; acidic materials such as hydrochloric acid, sulphuric acid, potassium bisulphate, benzene sulfonic acid, sodium bisulphite and the like; metal salts such as ammonium chloride, calcium cresylate, aluminum chloride, sodium potassium salicylate, and zinc chloride; and organic materials such as hexamethylenetetramine, urea, acetamide, etc. Of these, hexamethylenetetramine is preferred, although hydrochloric acid is also very effective. Hexamethylenetetramine appears to permit the reaction to take place at lower temperatures and in shorter times than do the other catalysts. The catalysts may be employed in varying amounts, all with satisfactory results. Hexamethylenetetramine, for example, has been used with molar proportions of a mercapto aryl thiazole, formaldehyde and phenol in amounts varying from 2 grams to 40 grams. With the larger amounts, such as 30 grams and over, care should be taken in the conduction of the reaction because of the rapid exothermic rise in temperature with an attendant tendency toward frothing.

Just what happens in the reaction is not known. It appears, however, that there is a definite chemical reaction between all of the three reactants and that water is condensed out, although it is believed that less than a mol of water per molar quantities of reactants is evolved. It has been found that the formaldehyde and mercapto aryl thiazole may be employed in the form of their reaction product, the aryl thiazyl 1-thio methylene hydrin, with as good results as by reacting them simultaneously with the phenol. Also, instead of using ordinary commercial aqueous formaldehyde it is possible to use the various formaldehyde-forming materials such as para formaldehyde and other polymeric forms of formaldehyde. It will be understood that where the word "formaldehyde" is employed in the claims it includes such formaldehyde-forming materials. It will also be understood that the invention is not to be limited by any theories expressed herein.

In preparing the accelerators any mercapto aryl thiazole may be used, although mercaptobenzothiazole is preferred. Others are 1-mercapto 5-nitro benzothiazole, 1-mercapto 5-chlor benzothiazole, 1-mercapto 3-methyl benzothiazole, 1-mercapto 3-phenyl benzothiazole, 1-mercapto 4-nitro 5-chlor benzothiazole, 1-mercapto 3-ethoxy benzothiazole, 1-mercapto 5-methoxy benzothiazole, 1-mercapto xylyl thiazoles, 1-mercapto 5-hydroxy benzothiazole, the corresponding 1-mercapto alpha and beta naphthathiazoles and similar mercapto aryl thiazoles.

Illustrative of the phenol useful in the preparation of the accelerators of the invention are phenol, alpha and beta naphthol, cresylic acid (a mixture of o-, m- and p-cresols and xylenols), resorcinol, catechol, o-, m-, or p-phenyl phenol, benzyl phenol, cyclohexyl phenol, chloro phenol, 2- or 4-chloro-o-phenyl phenol, hydroquinone, salicyclic acid, salicyl aldehyde, guaiacol, the xylenols such as 1, 3, 5-xylenol, the alkoxy phenols such as para hydroxy anisole and para hydroxy phenetole, the substituted naphthols such as the methyl and ethyl naphthols, p-tertiary butyl- or amyl phenol, alpha alpha gamma gamma-tetramethyl butyl phenol, 8-hydroxy quinoline and pyrogallol. The mono hydroxy phenols are in general preferred.

Further illustrative of the preparation of the accelerators of the invention are the following examples which are to be understood as illustrative only and not limitative.

EXAMPLE 1

A mixture of 98.5 grams of hydroxy methyl benzothiazyl sulphide having the formula

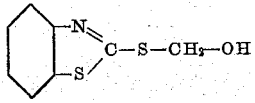

47 grams of phenol and 1 gram of sodium hydroxide in 4 cc. of water was heated in a beaker on an oil bath at a temperature of 140–150° C. for a period of 5 hours. The temperature was then raised to 170° C. and the heating continued for an additional period of 2 hours. The resulting reaction product, upon cooling, was a transparent, reddish-colored, brittle resin weighing 121.7 grams. It started to melt at a temperature of 65° C. and was not completely melted at 95° C.

EXAMPLE 2

A solution of 14.4 grams of beta naphthol and 19.7 grams of hydroxy methyl benzothiazyl sulphide in 150 cc. of glacial acetic acid was allowed to stand overnight, during which time a crystalline product separated. This crystalline product, when removed by filtration and drying, weighed 17.5 grams. After several recrystallizations from toluene it melted at a temperature of 156–157° C. Its structure was not determined but it is thought that it may have one of the following two formulae:

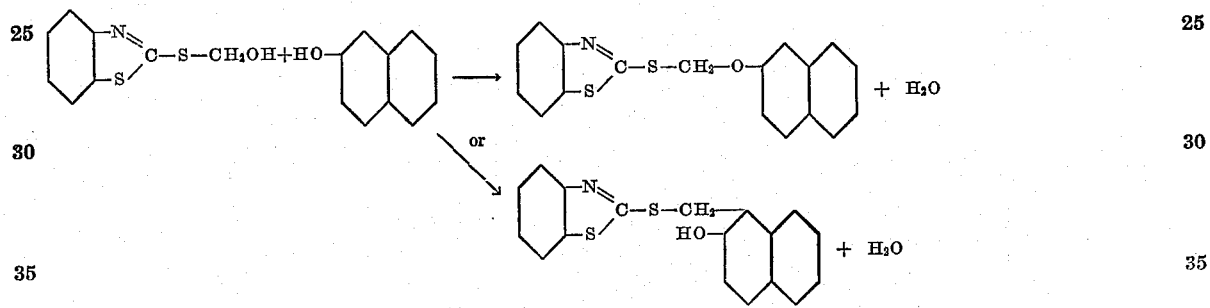

These suppositions are supported by nitrogen and sulphur analyses, an average nitrogen content of 4.34% and an average sulphur content of 19.86% being found. The calculated nitrogen and sulphur contents for a compound having the formula $C_{18}H_{13}OS_2N$ are 4.34% nitrogen and 19.85% sulphur.

EXAMPLE 3

½ mol each of hydroxy methyl benzothiazyl sulphide and phenol were heated in an open beaker on a sand bath for 1 hour at a temperature of 165° C. Thereupon, 1 gram of finely powdered sodium hydroxide was added. Immediately there was produced a cherry red color, a 15° increase in temperature and a marked tendency toward frothing. The mixture was then heated for an additional period of 3 hours at 175–180° C. and then cooled. The product was a semi-crystalline, reddish colored resin and was obtained in the amount of 107 grams.

EXAMPLE 4

A mixture of half molar quantities of hydroxy methyl benzothiazyl sulphide and phenol and 1 gram of sodium hydroxide dissolved in 8 cc. of water was heated in a beaker in an oil bath for 5 hours at 140–150° C. and thereafter for two hours at 170–175° C. Upon cooling the reaction mixture, a solid amber resin formed which was easily powdered to an amber yellow solid.

EXAMPLE 5

A mixture of 1 gram of hexamethylenetetramine and ½ molar quantities of hydroxy methyl benzothiazyl sulphide and phenol was heated. The reaction appeared to begin at a temperature of 115–120° C., the melted mixture remaining amber in color. The mixture was then heated for 2 hours at 150–160° C. and cooled. A brittle amber resin which was easily ground to a canary yellow powder melting at 60–65° C. was obtained in an amount of 132 grams.

EXAMPLE 6

1 gram of acetamide and ½ molar portions of hydroxy methyl benzothiazyl sulphide and phenol were heated for 6 hours at 170–175°, whereupon there was obtained a cherry red resin which crystallized upon cooling in an amount of 98 grams. The product was easily ground to a finely powdered, flesh-colored solid melting over the range of from 70 to 130° C.

EXAMPLE 7

A mixture of 1 gram of zinc chloride with ¼ mol each of 1-mercaptobenzothiazole, mixed cresols (U. S. P.) and paraformaldehyde was heated for 2¼ hours at a temperature ranging between 130 and 185° C. A resinous product, yellow in color after grinding, was obtained in the amount of 64.5 grams.

EXAMPLE 8

½ mol each of hydroxyl methyl benzothiazyl sulphide and mixed cresols (U. S. P.) were heated in a beaker on a sand bath with 1 gram of hexamethylenetetramine for 1½ hours at 140–150° C. and then for 2 hours at 165–170° C. Upon cooling and grinding the resulting resin, a canary yellow powder, was obtained.

EXAMPLE 9

Illustrating the use of varying quantities of hexamethylenetetramine, several products were made according to the procedure outlined in the preceding examples. The results are recorded in the following Table I. In each a ½ mol quantity of hydroxy methyl benzothiazyl sulphide was used:

*Table I*

| Mixed cresols | Hexa | Time | Temp. | Yield | Melting point | Code No. |
|---|---|---|---|---|---|---|
| Grams | Grams | Minutes | °C. | Percent | °C. | |
| 54 | 5 | 90 | 140–160 | 92 | 70–80 | A |
| 43 | 2 | 180 | 140–160 | 90 | 75–85 | B |
| 54 | 10 | 45 | 110–115 | 96 | 82–85 | C |
| 54 | 20 | 30 | 110–115 | 99 | 69–71 | D |
| 54 | 15 | 15 | 110–115 | 94 | | Q |

"Hexa" stands for hexamethylenetetramine.

The use of 20 grams of hexamethylenetetramine per ½ mol of cresols and ½ mol of hydroxy methyl benzothiazyl sulphide caused excessive frothing and the reaction was rather difficult to control. It is, therefore, generally preferable to employ smaller quantities of hexa methylene tetramine.

EXAMPLE 10

½ molar quantities of 1-mercaptobenzothiazole (83 grams), paraformaldehyde (15 grams), mixed cresols (54 grams), and 10 grams of hexamethylenetetramine were heated for 35 minutes at temperatures of 105–130° C. Upon cooling the resulting product, a clear resin melting at 80–85° C. was obtained in a 95% yield. The product appeared to be very similar to those obtained in Example 9.

EXAMPLE 11

5 mols each of 1-mercaptobenzothiazole, paraformaldehyde and mixed cresols were melted together at 100–105° C. in the presence of 100 grams of hexamethylenetetramine. After heating for 20 minutes at 105° C., an additional 50 grams of hexamethylenetetramine were added. The reaction mixture was again heated for 20 minutes at 105–110° C. Some frothing due to the initial exothermic reaction and again upon the second addition of catalyst took place. 3.7 pounds of a yellow powder were obtained after grinding the cooled product.

EXAMPLE 12

Molar quantities of 1-mercaptobenzothiazole, formaldehyde and mixed cresols were melted on a sand bath, whereupon 12 cc. of concentrated aqueous hydrochloric acid (35–36% HCl) were added. The mixture was heated at 100–130° C. for a period of 45 minutes. Upon the addition of the HCl an exothermic reaction took place immediately. The product resinified, but somewhat more slowly than did those products prepared by using hexamethylenetetramine. However, resinification took place much more rapidly than when sodium hydroxide was used. Upon cooling, it suddenly turned opaque and became hard. It was obtained in a yield of 95.5%.

EXAMPLE 13

83.5 grams of mercaptobenzothiazole, 15 grams of paraformaldehyde, 15 grams of hexamethylenetetramine and 54 grams of so-called "high boiling cresols", boiling at 210–240° C. and consisting mostly of xylenols, were mixed together and heated for forty minutes at a temperature of 110–140° C. The resulting resin when cooled and ground was a yellow powder in the amount of 160 grams.

EXAMPLE 14

A mixture of ⅛ mol each of mercaptobenzothiazole, paraformaldehyde and beta naphthol and 5 grams of hexamethylenetetramine was heated for fifteen minutes at a temperature of 100–105° C. A brown resin formed in an approximately 90% yield. Upon cooling and then grinding the resin a yellow powder was obtained.

Several other reaction products of mercaptobenzothiazole, paraformaldehyde and mixed cresols were prepared using amounts of hexamethylenetetramine varying from 5 to 30 grams of hexamethylenetetramine per molar quantities of the three reactants. In each the reaction required from 20 to 45 minutes and temperatures of from 100 to 145° C., the higher temperatures being employed with the smaller quantities of hexamethylenetetramine. Yields in all cases were over 90%. Also, in these experiments the proportions of mercaptobenzothiazole, paraformaldehyde and cresols were varied from about ½ mol to about 0.70 mol of mercaptobenzothiazole, from about ½ mol to about 0.70 mol of paraformaldehyde. The amount of cresols was held constant, ½ mol of mixed cresols being used in each of the experiments.

In place of the mercaptobenzothiazole of the examples any other mercapto aryl thiazole may be employed. Similarly, other phenols than the beta naphthol, phenol, xylenols, and cresols of the examples may be used.

The accelerators of the invention are very good delayed action accelerators when employed with activating basic nitrogen-containing accelerators such as diphenylguanidine. Illustrating their use in rubber are the following formulae:

*Formula A*

|  | Parts by weight |
|---|---|
| Smoked sheet rubber | 100 |
| Zinc oxide | 5 |
| Titanium oxide | 10 |
| Sulphur | 3 |
| Accelerator | as indicated |

*Formula B*

| | Parts by weight |
|---|---|
| Smoked sheet rubber | 75 |
| Tire reclaim | 45 |
| Zinc oxide | 5.30 |
| Sulphur | 2.80 |
| Red oxide of iron | 12.60 |
| Blue ridge clay | 89.30 |
| Hardwood pitch | 5.30 |
| Mineral oil | 3.90 |
| Stearic acid | 1.20 |
| Antioxidant | 5.0 |
| Accelerator | as indicated |

*Formula C*

| | Parts by weight |
|---|---|
| Extracted pale crepe rubber | 100 |
| Zinc oxide | 5 |
| Sulphur | 3 |
| Stearic acid | 1.5 |
| Accelerator | as indicated |

Samples of rubber mixes corresponding to the above formulae and containing various accelerators of the invention were vulcanized for varying periods of time and tested for tensile and elongation. Illustrative results are as follows:

*Table II*

| Accelerator | Amt. pts. by wt. | Formula | Cure mins, °F. | Ult. Tens. kgs/cm.$^2$ | Max. elg. | Tens. at 500% | Tens. at 700% |
|---|---|---|---|---|---|---|---|
| Example 5 | 0.43 | | | | | | |
| DPG | .17 | A | 40/260 | 177 | 780 | 32 | 116 |
| Example 4 | .43 | | | | | | |
| DPG | .17 | A | 30/260 | 170 | 750 | 36 | 128 |
| Example 8 | .43 | | | | | | |
| DPG | .17 | A | 30/260 | 166 | 770 | 32 | 113 |
| Example 6 | .45 | | | | | | |
| DPG | .15 | A | 20/260 | 194 | 670 | 38 | 141 |
| Example 9A | .45 | | | | | | |
| DPG | .15 | A | 40/260 | 160 | 760 | 32 | 115 |
| Example 9D | .45 | | | | | | |
| DPG | .15 | A | 30/260 | 186 | 760 | 32 | 134 |
| Example 1 | .5 | C | 80/285 | 76 | 850 | 12 | 30 |
| Example 1 | .5 | | | | | | |
| DPG | .2 | C | 30/260 | 158 | 815 | 20 | 78 |
| Example 10 | .45 | | | | | | |
| DPG | .15 | A | 30/260 | 169 | 775 | 32 | 114 |
| Example 11 | .35 | | | | | | |
| DPG | .15 | A | 30/260 | 176 | 775 | 33 | 118 |
| Example 6 | .45 | | | | | | |
| DPG | .15 | B | 11/315 | 118 | 430 | | |
| Example 9B | .45 | | | | | | |
| DPG | .15 | B | 11/315 | 121 | 450 | | |
| Example 8 | 1.00 | | | | | | |
| DPG | .40 | B | 11/315 | 116 | 410 | | |
| Example 14 | .35 | | | | | | |
| DPG | .15 | A | 40/260 | 178 | 760 | 37 | 136 |

DPG stands for diphenylguanidine.

It will be apparent that the accelerators of the invention provide excellent cures at relatively short times and at relatively low temperatures. They are very easily incorporated in rubber stocks, are stable and may be stored for relatively long periods of time without danger of decomposition.

It will be obvious that numerous modifications of the examples described herein may be made without departing from the scope of the invention. Thus, various other activating basic nitrogen accelerators such as dibenzyl amine, ammonia, di-o-tolyl guanidine, 2-4-diamino diphenyl amine, diphenylguanidine neutral succinate, diphenylguanidine neutral phthalate, urea, etc. may be employed in place of the diphenylguanidine of the examples. It is intended that the patent shall cover, by suitable expression in the appended claims, whatever features of patentable novelty reside in the invention.

This application is a division of application Serial No. 89,124, filed July 6, 1936.

What I claim is:

1. The reaction product of a mercaptobenzothiazole, formaldehyde and a phenol, said product being obtainable by causing a mixture consisting of a mercaptobenzothiazole, formaldehyde and the phenol to react in the presence of a resinifying catalyst.

2. The process which comprises reacting a mixture consisting of a mercaptobenzothiazole, formaldehyde and a phenol.

3. The process which comprises reacting a mixture consisting of a mercaptobenzothiazole, formaldehyde and a phenol in the presence of a resinifying catalyst.

4. The process which comprises reacting a mixture consisting of a mercaptobenzothiazole, formaldehyde and a phenol in approximately molar proportions and in the presence of a resinifying catalyst.

5. The process which comprises reacting a mixture consisting of a mercaptoarylthiazole, formaldehyde and a phenol in the proportion of from about ½ mol to about 1½ mols of the thiazole, from about ½ mol to about 1½ mols of formaldehyde, and from about ½ mol to about 1½ mols of the phenol and in the presence of a resinifying catalyst.

6. The process which comprises reacting a mixture consisting of hydroxy methyl benzothiazyl sulphide with a phenol.

7. The process which comprises reacting a mixture consisting of a mercaptobenzothiazole, formaldehyde, and a phenol in the presence of hexamethylenetetramine.

8. The process which comprises reacting a mixture consisting of a mercaptobenzothiazole, formaldehyde, and a phenol in the presence of hydrochloric acid.

9. The process which comprises reacting a mixture consisting of a mercaptoarylthiazole, formaldehyde and a phenol.

10. The reaction product of 1-mercaptobenzothiazole, formaldehyde and cresylic acid, said product being obtainable by causing a mixture consisting of 1-mercaptobenzothiazole, formaldehyde and cresylic acid to react in the presence of a resinifying catalyst.

11. The reaction product of 1-mercaptobenzothiazole, formaldehyde and phenol, said product being obtainable by causing a mixture consisting of 1-mercaptobenzothiazole, formaldehyde and phenol to react in the presence of a resinifying catalyst.

12. The reaction product of 1-mercaptobenzothiazole, formaldehyde and mixed xylenols, said product being obtainable by causing a mixture of 1-mercaptobenzothiazole, formaldehyde and mixed xylenols to react in the presence of a resinifying catalyst.

13. The reaction product of a mercapto aryl thiazole, formaldehyde and a phenol, said product being obtainable by causing a mixture consisting of a mercaptoarylthiazole, formaldehyde and a phenol to react in the presence of a resinifying catalyst.

LORIN B. SEBRELL.